Sept. 11, 1956
C. E. HEMMINGER
2,762,752
FLUID HYDROFORMING
Filed Aug. 4, 1952
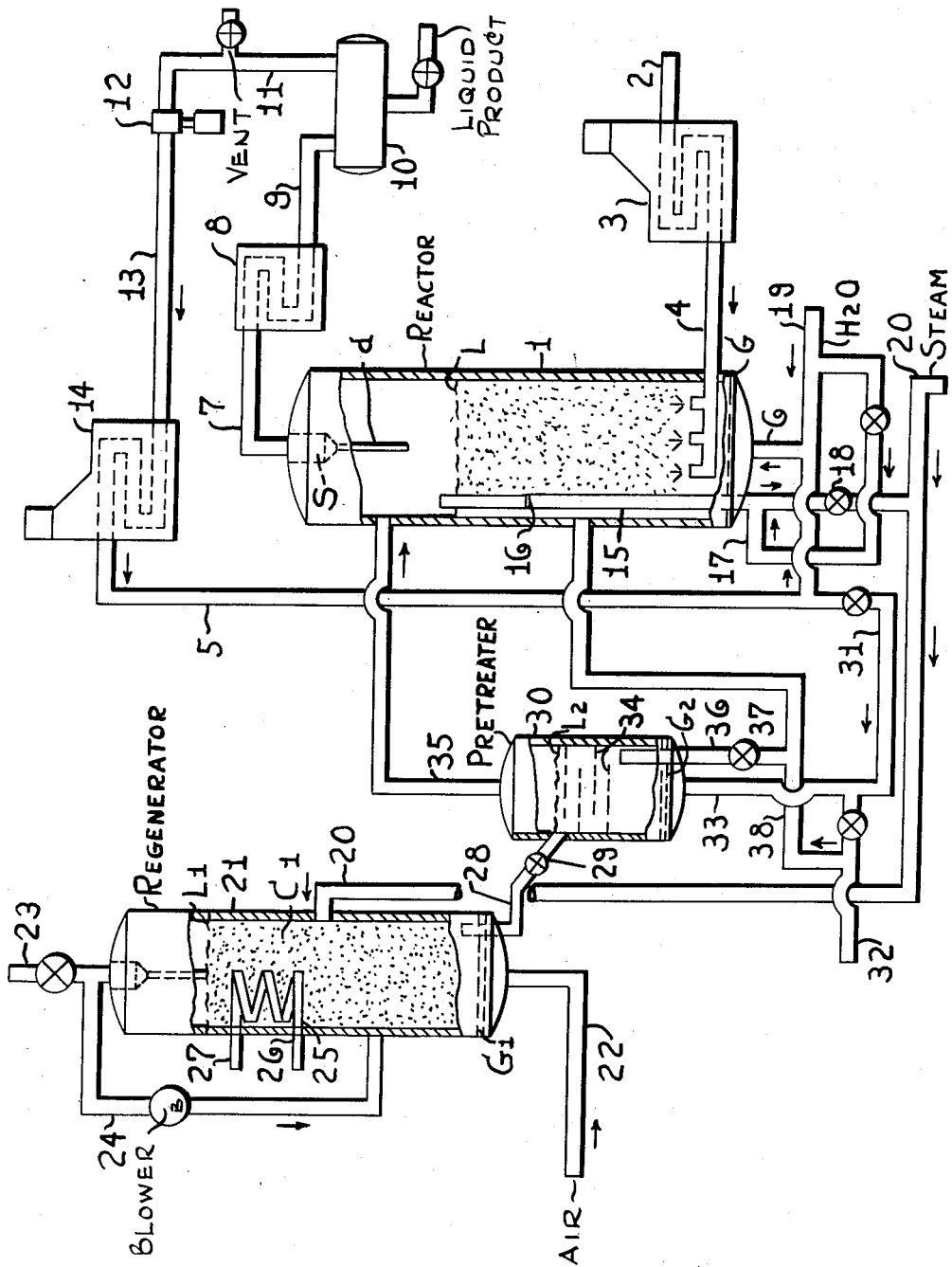
Charles E. Hemminger  Inventor
By J. Cashman  Attorney United States Patent Office 2,762,752
Patented Sept. 11, 1956

2,762,752

FLUID HYDROFORMING

Charles E. Hemminger, Westfield, N. J., assignor to Esso Research and Engineering Company, a corporation of Delaware Application August 4, 1952, Serial No. 302,585

5 Claims. (Cl. 196—50)

The present invention relates to improvements in the hydroforming of naphthas.

More particularly, the present invention relates to improvements in the regeneration of the hydroforming catalyst which is employed in the said hydroforming operation.

Hydroforming is an operation in which a naptha, such as a straight run or virgin naptha is subjected at elevated temperatures and pressures and in the presence of added hydrogen to the influence of a solid catalytic material. Usually the feed contains substantial amounts of naphthenic hydrocarbons which are dehydrogenated to the corresponding aromatic during the hydroforming operation. However, other reactions occur during the hydroforming, such as cyclicizing and dehydrogenation of paraffins to form additional quantities of aromatics; isomerization of straight chain paraffins to form isoparaffins; and some hydrocracking.

The present invention in its preferred modification employs the so-called fluidized catalyst technique in a multi-vessel system comprising a reactor and a regenerator, in other words, the catalyst in the reactor and in the regenerator is in the form of a dense fluidized bed in each vessel. The result of this, of course, is that the process is rendered continuous and has a further advantage that the bed of catalyst in each vessel can be maintained at a substantially uniform temperature throughout due to the thorough and intimate mixing. However, it is usually desired to maintain the top of the bed in the reactor at a higher temperature than prevailing at the bottom thereof. A pretreating vessel for partially reducing metal oxide catalyst and/or removing water from said catalyst withdrawn from the regenerator may also be included in the combination.

As stated, the most important aspect of the present invention has to do with the manner in which the catalyst is regenerated. As will appear more fully hereinafter the catalyst is regenerated under conditions such that the oxygen concentration of the regeneration gas in the regenerator is at a relatively low value in one phase of the regeneration, while in the second phase high oxygen concentration gas is used for regeneration. One advantage of so proceeding is that if a high sulfur stock is employed and the catalyst becomes contaminated with sulfur, the sulfur is removed without causing the formation of sulphate. For example, if in the case where the catalyst employed is, say, molybdenum oxide, the catalyst in contact with the sulfur feed in the reactor may react with the sulfur in the feed to form molybdenum sulfide. When the catalyst is conducted to the regenerator and treated with air, there is danger that the molybdenum sulfide may be oxidized to molybdenum sulphate, a very stable compound not readily reducible. Molybdenum sulphate is not an active hydroforming catalyst. As indicated previously, by the use of the regeneration gas of relatively low oxygen for the primary regeneration step, the formation of molybdenum sulphate is avoided and sulfur is eliminated from the catalyst as $SO_2$.

Another aspect of the present invention is that by employing regeneration gas in the regenerator of low oxygen content, the burning rate of the combustibles, such as carbonaceous material and hydrogen occurs at a much slower rate on the surface of the catalyst so that the heat release per unit of surface occurs at a lower rate and the catalyst is protected from overheating and impairment of its activity. This latter advantage is particularly true where the catalyst is supported platinum. When the combustible content of the catalyst is low, high concentration of oxygen in the regeneration gas may be used.

Another aspect of the present invention has to do with pretreating the hot regenerated catalyst and this involves treating the said catalyst in a pretreating vessel with a mixture of "recycled" gas, i. e., hydrogen-containing gas and an inert gas e. g. methane, nitrogen, etc. for the purpose of controlling the degree of reduction and substantially removing all of the water associated therewith during the reduction. In other words, as the catalyst leaves the regenerator, in the case where the catalyst is supported molybdena, it is usually in its highest state of valence, namely, at a valence of 6. It is customary to pretreat the catalyst with hydrogen to reduce it to a valence of 4–5 because it has been found that molybdenum in its highest state of valence causes degradation of the feed in the hydroforming reaction. During this pretreating or reduction of the catalyst, the amount of hydrogen employed is such that over-reduction of the molybdena is avoided, namely, the reduction is carried to the desired degree but not beyond the point where molybdena has a valence of 4 corresponding to the formula $MoO_2$. The purpose of including methane with the hydrogen during this pretreating is to remove the water formed during the reduction and also to provide a fluidizing gas.

Another aspect of the present invention involves adding a relatively small controlled amount of water to the reactor to avoid over-reduction of the catalyst in the reactor. This prevention of the over-reduction of the catalyst in the reactor applies, of course, only to the metal oxide catalyst, such as the aforementioned molybdenum oxide. In the case where the catalyst is supported platinum, no water is added to the reactor.

Referring again to the pretreater in the case where the catalyst is supported platinum, there is no extensive reduction of platinum and, therefore, the treatment in the supported platinum is for the purpose of drying the catalyst and removal of adsorbed carbon oxides by stripping.

The main object of the present invention, therefore, has to do with improvements in the fluidized catalyst technique of hydroforming naphthas wherein the oxidative regeneration of the catalyst, including the platinum catalyst, is conducted in a more efficient manner than attainable by conventional practice resulting in extending the catalyst life at a high activity level and otherwise improving the catalyst regeneration.

Another object of the present invention is to prevent over-reduction of the catalyst by adding relatively small amounts of water to the reactor in the case where the catalyst employed is a supported VI group metal oxide, such as molybdenum oxide.

Another object of the present invention is to improve the hydroforming operation by means assuring the substantial absence of water in the reactor where the catalyst is a supported platinum group metal, such as platinum itself or palladium.

Other and further objects of the present invention will appear in the following more detailed description and claims.

In the accompanying drawing there is shown, diagrammatically the essential elements of an apparatus in which a preferred modification of the invention may be carried into effect.

Referring in detail to the drawing, it is seen that 1 represent a reactor which contains a body of powdered catalyst C extending from a grid or screen G to an upper dense phase level L. This catalyst is of such a particle size that it may be readily fluidized. For example, in the case where the catalyst is 10 wgt. per cent of $MoO_3$ on 89 wgt. per cent of an active alumina, and 1 wgt. per cent silica, a good particle size distribution for fluidization would be as follows:

| | Percent |
|---|---|
| 0–20 microns | 5 |
| 20–40 microns | 35 |
| 40–80 microns | 50 |
| 80–200 microns | 10 |

In the case where the catalyst is, say, ½% platinum by weight on 98.5% active alumina and 1% silica, the particle size distribution having good fluidizable characteristics is the same as above.

The oil feed is introduced in the present system through line 2, thence passed through suitable heating means such as furnace 3 where it is heated to a temperature of about 950°–1000° F. and thence charged to reactor 1 via line 4. It will be noted that the oil is fed to the reactor in close proximity to but above the gas distributing member G. Simultaneously, recycle gas, that is to say, hydrogen-containing gas obtained from the product recovery system is recovered from recycle line 5, thence charged via line 6 to the bottom of the reactor wherein it passes upwardly through a grid G and co-mingles with the oil vapors and the catalyst. Under conditions more fully set forth hereinafter, the desired hydroforming reaction occurs and the raw product emerges from the dense phase of the fluidized bed and passes into a catalyst disengaging space disposed between L and the top of the reactor. In this disengaging space the catalyst is in the form of dilute suspension, for it is the purpose, in this type of operation, to effect separation of the main bulk of the catalyst from the gasiform material within the reactor. The raw product is forced through one or more gas-solids separating devices S wherein entrained catalyst is separated and returned to the dense phase by one or more dip pipes $d$. The product is withdrawn from the reactor through line 7 and thence passed through a cooler 8 where it is cooled sufficiently to condense the higher boiling constituents whereupon the cooled product is withdrawn through line 9 and charged to separator 10. From separator 10 the recycle gas, namely, a gas containing 55–85% hydrogen admixed with $C_1$–$C_3$ hydrocarbons is withdrawn overhead from separator 10 via line 11, thence passed through a compressor 12, thence delivered via line 13 to a reheat furnace 14 where the recycle gas is heated to a temperature of about 1200° F., thence withdrawn from the furnace 14 through line 5 and delivered to line 6 for reuse in the process as previously explained.

In the case where the catalyst is molybdenum oxide supported on, say, active alumina, or some other supported group VI metal oxide, it is desirable and necessary to add relatively small controlled amounts of water to the reactor, for it has been found that such water addition improves the selectivity in the operation. In other words, by preventing over-reduction of the catalyst, this selectivity is reflected in the increased yields of $C_4+$ hydrocarbons and a decrease in the amount of $C_1$–$C_3$ hydrocarbons found in the product. Toward this end, water is injected to the system via line 19 and passes into line 6 where it mixes with the recycle gas therein and thence passes with the latter into the reactor.

As is well known in hydroforming practice, the catalyst in the reactor becomes contaminated with carbonaceous and sometimes sulfurous deposits which lower its activity and require removal of such contaminants by regeneration. Toward this end, catalyst is withdrawn from the reactor 1 through a standpipe 15 which also serves as a stripping zone. The catalyst passes from the dense phase into the stripper 15 through an orifice 16. Steam or some other suitable gas, such as nitrogen or flue gas, is charged via line 17 to a point at near the bottom of standpipe 15, and this stripping gas passes upwardly countercurrent against the downcoming catalyst, serving to strip off volatile hydrocarbons and sulfur compounds. The stripping gas discharges into the top of the reactor at a point above the dense phase level as indicated in the drawing, thus preventing contamination of the catalyst with these stripping gases. It is to be noted that the standpipe 15 is provided at its lower end with a control valve 18. The catalyst discharges from the lower end of the standpipe 15 into a stream of inert gas flowing in line 20. This gas may be steam, nitrogen or a flue gas. In line 20 the catalyst is formed into a suspension and carried into regenerator 21. Although considerably smaller than reactor 1, regenerator 21 is of similar design and construction and is provided with a gas distributing means $G_1$ similar to G in reactor 1. It is to be noted that the catalyst in line 20 is charged to regenerator 21 at a point midway or above the mid point of a dense fluidized bed of the catalyst which extends from $G_1$ to an upper dense phase level $L_1$. Air for the regeneration of the catalyst is introduced through line 22 into the bottom of regenerator 21 wherein it passes upwardly through the gas distributing means $G_1$ into the bed of catalyst. Preferably, the concentration of oxygen in the upper part of the regenerator is kept lower than in the lower part of the regenerator by introducing an inert material such as flue gas which may be recovered from the effluent stream 23 of the regenerator and returned via valved line 24 into the regenerator 21 at a point above grid $G_1$ but below the entrance of the catalyst in line 20 to regenerator 21. Under conditions more fully set forth hereinafter, the regeneration of the catalyst proceeds. It is pointed out, however, that in spite of the fact that the oxygen concenration of the regeneration gas in the upper part of the regenerator is relatively low, nevertheless, it may be desirable, or even necessary, to provide cooling means 25 disposed in the fluidized bed of catalyst $C_1$ undergoing regeneration in the regenerator. Toward this end, therefore, a cooling medium may be introduced via line 26 into a cooling coil 25 and withdrawn through line 27. It is apparent that this procedure of catalyst regeneration provides for the burning of the greater portion of the carbon with low concentrations of oxygen while the residual carbon, more difficult to burn, is removed in the bottom of the regenerator with high oxygen concentration gas. An alternate procedure to insure complete removal of residual carbonaceous material in the regenerator is to suspend, occasionally, for an extended period, say, 1–12 hours, catalyst flow into and out of the reactor, and thus to cause the catalyst to remain therein for an extended period of time. This interruption or suspension of the flow of catalyst into and out of the reactor may be accomplished by closing valve 18 at the bottom of standpipe 15, thus preventing the flow of catalyst into the regenerator from the reactor, and at the same time holding catalyst in the regenerator by closing valve 29 in drawoff pipe 28. By thus proceeding the oxygen concentration in the regenerator 21 will increase almost to 21% because of the absence of any substantial amount of carbon on the catalyst, and thus the catalyst will be exposed to a "soaking" in a relatively high oxygen atmosphere. Some fuel may be added to the regenerator so as to maintain the temperature in the range of from about 900°–1200° F.

The regenerated catalyst is withdrawn by gravity flow from regenerator 21 via line 28 controlled by a valve 29 and is charged into a pretreating vessel 30. In the case where the catalyst is supported molybdenum oxide, the said catalyst is treated with recycled gas withdrawn from line 5 via line 31 and admixed with methane or natural gas or an inert gas as nitrogen which is introduced into the system through line 32, and the mixture of recycle gas and inert gas is charged to the bottom of pretreater 30 through line 33. The amount of recycled gas employed should be such as to reduce the catalyst only to the extent that its valence is not below 4, preferably, is between 4 and 5.0. The purpose of the methane or other gas is to provide a sufficient volume of gas to form the fluidized bed in pretreater 30 extending from a gas distributing means $G_2$ to an upper dense phase level $L_2$. It is to be noted that there are disposed in pretreater 30 in the dense fluidized bed a plurality of spaced horizontal perforated baffles 34 which serve to prevent back-mixing of the catalyst and to cause countercurrent solid-gas flow. Pretreating and fluidizing gas is withdrawn from pretreater 30 via line 35 and charged into the reactor 1 at a point above the upper dense phase level L.

The pretreated catalyst is withdrawn from pretreater 30 through a drawoff pipe 36 carrying a flow control valve 37 and thence charged into a carrier gas in line 38 which may be withdrawn from line 32. In line 38 the catalyst is formed into a suspension and charged to reactor 1 as shown.

In order to give more specific information regarding the present invention and the results attainable thereby, the following operating conditions giving good reuslts are set forth:

(A)

Conditions in reactor 1

Catalyst—10% $MoO_3$, 2% $SiO_3$, 88% $Al_2O_3$ (wgt. percent)
Temperature—925° F. preferred, 875°–975° F. range
Pressure—200 p. s. i. preferred, 100–350 p. s. i. range
Cubic feet of hydrogen-containing gas fed to the reactor per bbl. of oil—3500 preferred, 2000–6000 range
Concentration of hydrogen-containing gas [1]—55–85%
Feed rate w./hr./w.[2]—0.1–1.5, depending on the feed stocks and desired quality
Lbs. catalyst to lbs. oil ratio fed reactor—1.0 preferred, 0.5 to 4.0 range
Linear superficial velocity of gasiform material—0.2 to 0.8 ft./sec.

Conditions in regenerator 21

Temperature, °F.—1125° preferred, 900–1200° F., range
Pressure—200 p. s. i. preferred, 100–350 p. s. i. range
Residence time—20 min. preferred, 10–60 min. range
Concentration of oxygen in upper part of regenerator—2% preferred, 1–5% range

Conditions in pretreater 30

Temperature, °F.—1125° preferred, 1050–1200° F. range
Pressure—200 p. s. i. preferred, 100–300 p. s. i. range
Residence time—30 sec. preferred, 10–120 sec. range
Cubic feet of hydrogen per lb. of molybdenum oxide catalyst—0.4 preferred, 0.2–0.8 range
Amount of methane or other inert gas, cu. ft. per lb. of molybdenum oxide catalyst—2.0 preferred, 1.0–10 range (B)

Conditions in reactor 1 (Pt as catalyst)

Catalyst—0.5% Pt, 99.5% $Al_2O_3$ (wgt. percent)
Temperature, °F—900° preferred, 875–975° F. range
Pressure—250 p. s. i. preferred, 150–500 p. s. i. range
Cu. ft. of hydrogen-containing gas fed to reactor per bbl. of oil—4000 preferred, 3000–7000 range
Percent $H_2$ in above $H_2$-containing gas—55–85%

[1] All vapors and gas measured at standard conditions.
[2] W./hr./W.=lbs. of oil per hour per lb. of catalyst in reactor.

Feed rate, w./hr./w—1–5, depending on the feed stock and desired quality
Lbs. catalyst to lbs. oil fed to reactor—.01 preferred, 0.001 to 0.05 range
Linear superficial velocity of gasiform material—0.2–0.8 ft./sec.

Conditions in regenerator 21

Temperature, top section—900° F. preferred, 800–1100° F. range
Temperature, bottom section—950° F. preferred, 850–1150° F. range
Temperature with no catalyst flow—1100° F. preferred, 1000–1300° F. range
Pressure—250 p. s. i. preferred, 150–500 p. s. i. range
Residence time during catalyst flow—4 hours preferred, 1–12 hours
Concentration of oxygen in upper part of regenerator—2% preferred, 0.5–3% range

Conditions in pretreater 30

Temperature—950° F. preferred, 850–1150° F. range
Pressure—250 p. s. i. preferred, 150–500 p. s. i. range
Residence time—1 hr. preferred, 0.2–5 hrs. range
Cu. ft. of hydrogen per lb. of platinum catalyst—10 preferred, 2–50 range
Amount of methane or other inert gas in per cent of total gas fed to pretreater—50 preferred, 10–100 range Numerous modifications of the present invention may be made by those skilled in the art without departing from the spirit thereof.

I claim:

1. In the regeneration of a dense fluidized bed of a hydroforming catalyst with air in a regeneration zone, the improvement which comprises, first, treating at regeneration temperatures the catalyst with a regeneration gas containing from about 0.5–3% oxygen, thereafter treating the catalyst undergoing regeneration with a gas having an oxygen concentration of about 21% in order to substantially completely burn off inactivating carbonaceous deposits the duration of said treatments being sufficient to remove substantially all of the carbonaceous deposits from the catalyst and treating the regenerated catalyst following the foregoing steps for a period of from about 1 to 12 hours with a gas containing about 20% oxygen.

2. The method set forth in claim 1 in which the catalyst is treated following regeneration at a temperature within the range of from about 1000°–1300° F.

3. The method set forth in claim 2 in which the catalyst is molybdenum oxide on alumina, and which catalyst is treated with a hydrogen-containing gas also containing a sufficient amount of a diluent gas to remove water formed by reaction of the hydrogen with the regenerated catalyst prior to its return to the reaction zone.

4. The method according to claim 1 in which the catalyst is a platinum group metal carried on activated alumina.

5. The method according to claim 1 in which the catalyst is a platinum group metal carried on activated alumina and the treatment following regeneration is carried out at temperatures of from about 1000–1300° F.

References Cited in the file of this patent

UNITED STATES PATENTS

| | | |
|---|---|---|
| 2,366,372 | Voorhees | Jan. 2, 1945 |
| 2,406,112 | Schulze | Aug. 20, 1946 |
| 2,410,891 | Meinert et al. | Nov. 12, 1946 |
| 2,425,849 | Voorhees | Aug. 19, 1947 |
| 2,436,041 | Gerhold et al. | Feb. 17, 1948 |
| 2,494,614 | Grote | Jan. 17, 1950 |
| 2,641,582 | Haensel | Jan. 9, 1953 |
| 2,664,404 | Blatz et al. | Dec. 29, 1953 |